United States Patent [19]
Hitchems et al.

[11] Patent Number: 6,103,078
[45] Date of Patent: Aug. 15, 2000

[54] METHODS FOR PREPARING MEMBRANES WITH FLUID DISTRIBUTION PASSAGES

[75] Inventors: G. Duncan Hitchems, Bryan; Harry Jabs, College Station; Craig C. Andrews, College Station; Oliver J. Murphy, Bryan; William White, College Station; George W. Jackson, College Station; Charles L. C. Tennakoon, College Station, all of Tex.

[73] Assignee: Lynntech, Inc., College Station, Tex.

[21] Appl. No.: 09/390,740

[22] Filed: Sep. 7, 1999

Related U.S. Application Data

[63] Continuation-in-part of application No. 08/868,617, Jun. 3, 1997, Pat. No. 5,961,796.

[51] Int. Cl.[7] .................................................. C25B 13/00
[52] U.S. Cl. .............................. 204/296; 429/32; 429/35; 429/36; 429/38; 521/27
[58] Field of Search ................................. 521/27; 429/30, 429/31, 32, 33, 34, 35, 36, 38, 39; 204/296 252, 254, 268

[56] References Cited

U.S. PATENT DOCUMENTS

| | | | |
|---|---|---|---|
| 2,829,095 | 4/1958 | Oda et al. | 204/98 |
| 4,118,299 | 10/1978 | Maget | 204/265 |
| 4,214,969 | 7/1980 | Lawrance | 204/265 |
| 4,804,451 | 2/1989 | Palmer | 204/255 |
| 4,851,100 | 7/1989 | Hodgdon | 204/296 |
| 4,927,800 | 5/1990 | Nishiki | 502/349 |
| 5,262,250 | 11/1993 | Watanabe | 429/33 |
| 5,288,385 | 2/1994 | Kedem | 204/263 |
| 5,308,466 | 5/1994 | Ganzi | 204/151 |
| 5,635,039 | 6/1997 | Cisar et al. | 204/296 |
| 5,849,167 | 12/1998 | Posar | 521/27 |
| 5,958,616 | 9/1999 | Salinas et al. | 521/27 |

FOREIGN PATENT DOCUMENTS

| | | |
|---|---|---|
| 0422453 A2 | 9/1990 | European Pat. Off. . |
| 0477091 A1 | 9/1991 | European Pat. Off. . |
| 0563321 | 12/1991 | European Pat. Off. . |
| 6-67733 | 3/1994 | Japan . |
| 7-249418 | 7/1995 | Japan . |

*Primary Examiner*—Bruce F. Bell
*Attorney, Agent, or Firm*—Street & Associates; Jeffrey L. Streets

[57] ABSTRACT

The present invention provides improved ionically conducting membranes having internal passages therethrough and methods for making the improved membranes. The membranes may be formed from any ionically conducting material. In particular, the membranes may be formed of a single ionically conducting material, such as in a cation-conductive or anion-conductive membrane, or a plurality of ionically conducting material, such as in a bipolar membrane having a cation-selective region, an anion-selective region, and an interfacial region between the anion-selective region and the cation-selective region.

25 Claims, 8 Drawing Sheets

FIG. 1

FIG. 2A
(Step 1)

FIG. 2B
(Step 2)

FIG. 2C
(Step 3)

FIG. 2D

FIG. 3A
(Step 1)

FIG. 3B
(Step 2)

FIG. 3C
(Step 3)

FIG. 3D

FIG. 4A
(Step 1)

FIG. 4B
(Step 2)

FIG. 4C
(Step 3)

METHODS FOR PREPARING MEMBRANES WITH FLUID DISTRIBUTION PASSAGES

This is a continuation-in-part application of U.S. patent application Ser. No. 08/868,617 filed on Jun. 3, 1997 now U.S Pat. No. 5,961,796.

FIELD OF THE INVENTIONn

The present invention relates to ionically conductive membranes and methods for preparing ionically conductive membranes with fluid distribution passages therethrough.

BACKGROUND OF THE RELATED ART

A membrane with internal passages is disclosed in U.S. Pat. No. 5,635,039 (Cisar et al.). This membrane is a proton exchange membrane (PEM) that separates the anode and cathode of an electrochemical device and serves the dual purposes of conducting protons and electronically insulating the electrodes. In order to have good conductivity for protons, the PEM must be kept moist. This is necessary to hydrate the ion exchange sites, such as sulfonate sites, on the polymer to allow for proton transfer through the membrane. The internal passages allow the direct supply of water to the membrane instead of relying upon humidification of the reactants provided to the anode and/or cathode.

Cisar et al. further disclose that the internal passages in the membrane can be formed by pressing ionically conducting material around a plurality of removable elements at sufficient temperature and pressure to fuse the material into a single membrane. After the material is fused, the elements are removed from the membrane to leave a passage for fluid. The removable elements may take any shape or form so long as the passages provide a substantially uniform flow of fluid throughout the entire membrane. The preferred removable elements are substantially parallel wires or tubes, but may be elements which are later removed through dissolution.

Cisar et al. also discloses an alternative method for forming a membrane with internal passages that includes applying a recast film of ionically conducting material onto solid tubes or sheets of the same material. The recast film is preferably applied in multiple coats with drying time between each coat, followed by baking under nitrogen at 100 degrees Celsius in order to cure the recast material.

A membrane having internal passages allows water to be provided to the open ends of the passages along one edge of the membrane and delivered throughout the membrane. The water may even be circulated through the passages and exit the membrane at the open ends.

One exemplary method for producing bipolar membranes discloses that a cation-exchange membrane and an anion-exchange membrane can be laminated using a mixture of polyethyleneimine and epichlorohydrin to bond the membranes to each other by curing (Japanese Patent Publication No. 32-3962). A second method discloses the bonding of a cation-exchange membrane to an anion exchange membrane by using an adhesive having the properties of exchanging ions (Japanese Patent Publication No. 3403961). A third method discloses a pasty material comprising vinyl pyridine and an epoxy compound that is coated on the surface of a cation-exchange membrane, followed by exposure to radiation to obtain the bipolar membrane (Japanese Patent Publication No. 338-16633). A fourth method discloses a sulfonic acid polymeric electrolyte and an allylamine that are adhered to the surface of an anion-exchange membrane, followed by exposure to ionizing radiation (Japanese Patent Publication No. 51-4113). Yet another method discloses a process in which a polyethylene film is impregnated with styrene and divinylbenzene followed by polymerization to give a sheet-like material. The sheet-like material is then nipped between frames made of stainless steel, where one side thereof is sulfonated, and thereafter, the sheet is detached and the remaining side is chloromethylated followed by treatment for amination (U.S. Pat. No. 3,562,139). However, these bipolar membranes exhibit inherently poor current efficiency and high-power consumption. For example, the use of these bipolar membranes to split water requires application of a membrane potential (e.g. 2.5 V to 3.0 V, or higher) that is much higher than the theoretical water-splitting membrane potential (0.83 V).

Bipolar membranes have also been prepared by coating the mating surfaces of cation-and anion-exchange membranes with a solution comprising at least one kind of inorganic electrolyte, such as sodium tungstate, chromium nitrate, sodium metasilicate, and ruthenium trichloride. The mating surfaces are placed in contact and pressed to give the bipolar membrane having a low water splitting membrane potential. This bipolar membrane, compared with the bipolar membranes discussed above, is characteristic of a low water-splitting membrane potential. However, the water splitting potential of this membrane increases over a relatively short period of use due to the development of bubbles or blisters at the interface between the cation-exchange membrane and anion-exchange membrane. Partially or entirely separated membranes are rendered useless. Furthermore, this membrane still provides low current efficiency and is not satisfactory for use on an industrial scale.

Attempts have been made to increase the stability of such bipolar membranes, obtained by combining anion-exchange membranes with cation-exchange membranes, by applying an ion permeable adhesive between the two membranes. A polymerizable mixture of polyethyleneimine and epichlorohydrin (U.S. Pat. No. 2,829,095) or polyvinyl chloride and polyvinyl alcohol (Israel Journal of Chemistry, 9 (1971), 485) have been proposed as an adhesive. It has also been found that bipolar membranes suitable for electrodialysis may be obtained from an anion-exchange membrane, a cation-exchange membrane and an ion-permeable adhesive comprising an aqueous solution of a polyvinylamine.

Bipolar membranes are difficult to produce by conventional methods. For example, in a chemical treatment of the surface, the two layers must have uniform thickness and must be in contact with one another over the entire surface area in order to ensure the current flow. On the other hand, the layers must not penetrate one another since the membrane would then lose its bipolar selectivity. Although combining two monopolar membranes gives bipolar membranes possessing defined anionic and cationic layers, this method gives rise to difficulties at the contact surface. If the membranes are not completely in contact, the resistance increases. The same applies where the adhesive is not sufficiently conductive. Moreover, very undesirable tears or bubbles may form at the points of contact in bipolar membranes of the stated type under typical operating conditions.

Bipolar membranes which consist of two individual membranes and polyvinyl alcohol as an adhesive may be prepared by a method in which the cation-exchange films and the anion-exchange films are coated with a polyvinyl alcohol solution. The cation-exchange and anion-exchange films are laid one on top of the other and heated for about one hour at about 60° C. The bipolar membrane is then dried and compressed for about 30 minutes at about 100° C. Although the resulting bipolar membranes exhibit firm adhesion, their swellability in aqueous salt solutions is irreversibly restricted, and these bipolar membranes, which possess rectifying properties, are therefore unsuitable for electrodialysis.

Despite certain advances described above, the performance of bipolar membranes is still limited by the transport of water into the interfacial region. U.S. Pat. No. 4,851,100 proposes to increase water transport to the interfacial region by using a continuous layer of a cation-selective material that is sufficiently thin to reduce the distance the water must diffuse to reach the interfacial region. This bipolar membrane is made by affixing a thin castable cation exchange membrane to a defined base anion exchange membrane. While a bipolar membrane of this construction might provide some increase in the rate of water transport to the interfacial region, the water transport rate is still limited because it has to pass through an ion-selective layer.

Therefore, there is a need for an ionically conductive membrane and methods of making ionically conductive membranes having internal passages that provide for communication of fluids into the membrane. It would be desirable if the membranes would provide direct communication of fluids to the interfacial region, as well as stability and low electrical resistance. It would be further desirable if the methods of making the membranes were simple and reliable.

SUMMARY OF THE INVENTION

The present invention provides a method of making an ionically conductive membrane sheet, comprising securing two ionically conductive members together from opposing sides of at least one element to form a fluid passage adjacent to the at least one element and between the members, wherein the passage provides fluid communication from an edge of the members and along the at least one element. The ionically conductive material is preferably a sheet of material selected from cation-conductive material, anion-conductive material or a combination thereof The element may be of any configuration, such as a porous tube, a manifold, a channel bar, a filament of any cross-sectional shape, a mesh or combinations thereof. The elements may be ionically conducting, non-ionically conducting (inert), an inert core coating with ionically conducting material, cloth, ceramic, polymers, or the like.

Similarly, the invention also provides a method of making an ionically conductive membrane, comprising: providing first and second ionically conductive members; disposing at least one element between the first and second ionically conductive members; and bonding the first and second ionically conductive members to opposing sides of the element to provide a fluid passage between the first and second ionically conductive members. The first and second ionically conducting members are selected from cation-conductive members, anion-conductive members, or a combination thereof. The step of bonding may include one or more processes selected from hot pressing, applying an adhesive, or combinations thereof. Preferably, the first and second ionically conducting members are sheets, wherein the passage extends in a plane that is substantially parallel to the sheet surfaces. These methods may be used to make a membrane that is cation-conducting or anion-conducting or a bipolar membrane having cation and anion conducting regions.

Furthermore, the invention provides a method for making an ionically conductive membrane, comprising: disposing two or more elements over a surface of a first ionically conductive member; forming a layer of ionically conductive material over the two or more elements and into contact with the surface of the first ionically conductive member to form an ionically conductive surface having protrusions; and bonding a second ionically conductive member to the protrusions leaving passages between protrusions. Preferably, the two or more elements are elongated and the protrusions are ridges.

The invention includes a method for making an ionically conductive membrane, comprising directing a laser to cut into an ionically conductive sheet to form a plurality of substantially unobstructed linear passages through the sheet, wherein the passages are substantially parallel to a surface of the sheet.

In addition, the invention provides a method of making an ionically conductive membrane, comprising: providing a first ionically conductive member having a deformed surface defining a plurality of protrusions having peaks; and bonding a second ionically conductive member to the peaks of the protrusions to form passages between the peaks. Optionally, the second ionically conductive member may have a deformed surface defining a plurality of protrusions having peaks, and wherein the peaks of the first and second ionically conductive member are bonded. The bonding process is preferably selected from hot pressing, applying adhesive, radiation graft polymization, applying recast films or combinations thereof.

BRIEF DESCRIPTION OF THE DRAWINGS

So that the manner in which the above recited features and advantages of the present invention are attained can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention provides improved ionically conducting membranes and methods for making the improved membranes. The membranes may be formed from any ionically conducting material. In particular, the membranes may be formed of a single ionically conducting material, such as in a cation-conductive or anion-conductive membrane, or a plurality of ionically conducting material, such as in a bipolar membrane having a cation-selective region, an anion-selective region, and an interfacial region between the anion-selective region and the cation-selective region. The following description of the preferred embodiments emphasized the use of the invention for making bipolar membranes, but the invention is also applicable to membranes and methods of making membranes that are of a single type (i.e., the same material or at least the same type of material), such as solely cation-selective or solely anion-selective.

The improved membranes of the present invention include fluid passages therein to facilitate the transport of fluids into and/or out of the membrane, regardless of whether the particular membrane is cation-conductive, anion-conductive or bipolar. These passages may be provided in many shapes, sizes and configurations so long as the ionically conductive membrane has one or more continuous pathways of ionically conducting material extending from one side or face of the membrane to the other side or face in order to allow ions to pass therethough. Furthermore, the passages should not hinder the membrane from being an electronic insulator and should be free from leaks between the faces.

The fluid passages allow fluid to be delivered directly into the membrane, instead of relying upon the diffusion of fluid from the face of the membrane, either with or against the electroosmotic flow of fluid through the membrane. This direct fluid delivery can be useful in many applications, such as electrochemical cells, where the rate of ion transport through a typical ionically conductive membrane is limited by the amount of water available to the membrane. For example, the rate of electrodialysis in a bipolar membrane having water supplied through passages directly into the membrane is no longer limited by the rate of fluid diffusion through the cation or anion selective regions to the interfacial region. In many electrochemical systems, direct feeding of required reactants to the membrane allows for a simpler system. The passages may be utilized for supplying (feeding, introducing) a fluid to the membrane, for removing (taking away, withdrawing) a fluid from the membrane, or a combination of supplying and removing. One advantage of membranes with channels extending therethrough is that water will flow directly into the membrane with low pressure-drop inside the unit so that the regions of the membrane do not necessarily require a chemical or mechanical bond.

While the passage(s) may extend through any portion of the membrane, including entirely within the anion-selective region or entirely within the cation-selective region of a bipolar membrane, it is preferred that the passage walls provide fluid communication with a major portion of the membrane. In the case of a bipolar membrane, it is preferred to provide fluid to both the anion-conductive and cation-conductive regions, most preferably by having the fluid passage extend along or adjacent to the interface between the regions. However, the passage may be offset to have greater contact with one side of the membrane in order to increase the degree of hydration, for example in applications where one side of the membrane has a greater tendency to dry out. This may be accomplished using the techniques of the present invention to first form a monopolar membrane having passages, then bonding it to an ionically conductive membrane of the opposite type, such as a cation conductive membrane or member with passages being bonded to an anion conductive membrane or member, or the opposite. While the passages of the present invention preferably comprise a plurality of linear passages that run parallel to adjacent passages and lie within a plane that is substantially parallel to one or more surfaces of the membrane, it is within the scope of the invention that the passages may be irregular, interconnected and the like. Preferably the passages are contained within the membrane so that there is no direct fluid communication between the anode and cathode except through the ionically conducting material of the membrane.

The passages may be formed in many ways, perhaps using channel forming elements. Processes that do not require the use of elements of any type include (1) laser cutting or drilling of the passage through a membrane or (2) the coupling of two membranes where at least one of the two membranes has been formed with ridges or otherwise formed or deformed to provide contacting surfaces that will leave open passages therebetween.

Alternatively, the present methods of making ionically conductive membranes with internal passages may include the use of channel forming elements or networks of elements of various types, such as (1) removable elements, (2) secured elements on the membrane, (3) spacer elements, and (4) embedded elements. The removable elements are preferably made from niobium wire or polytetrafluoroethylene (PTFE) tubing which, upon removal after formation of the membrane, leave substantially unobstructed passages extending therethrough. Removable elements may also include dissolvable materials.

The secured, spacer and embedded type elements of the present invention are preferably made from an inert filament, a fluid-permeable material, an ionically-conductive material or a wicking material. Secured elements are considered to include members maintained within the membrane that form the passage or a portion of the passage therein, such as a manifold, perforated tube, channel bar, and the like. Spacer elements are objects that can be disposed or coupled between two ionically conductive members or regions in order to establish a spaced apart relationship between the two ionically conductive members or regions, yet allow for an ionically conductive pathway to be maintained between the faces of the resulting membrane. Because spacer elements set the two ionically conductive members apart from any direct contact, the spacer elements must provide an ionically conductive path through, across, around or otherwise between the two ionically conductive members. Consequently, spacer elements are preferably made from ionically conductive material, an inert material that has been coated with ionically conductive material, or an inert polymer matrix with ionically conductive material therethrough. Embedded elements are similar to spacer elements, except that they are integrated into a first ionically conducting member to form ridges, bumps or other protrusions covered by ionically conductive material. A second ionically conducting member may then be bonded to the tops of the ridges, thereby leaving fluid passages between, around or past the ridges.

A further aspect of the invention provides a membrane comprising a plurality of alternating cation-selective members or regions and anion-selective members or regions, each region disposed in contact with adjacent regions, and fluid distribution passages within at least two of the regions. In this manner, the fluid distribution passages may define compartments, analogous to those of conventional electrodialytic processes, that are contained within an integrated membrane. For example, the passage(s) between a first cation-selective region and a first anion-selective region may form a diluting compartment while the passage(s) between either a second cation-selective region and the first anion-selective region or a second anion-selective region and the first cation-selective region may form a concentrating compartment. It should be recognized that the fluid distribution passages may operate in either a fluid delivery mode or a fluid collection or removal mode. In addition, the passages may operate in ion-concentrating or ion-diluting mode. Other arrangements and processes will become apparent to those in the art given the disclosure herein.

The membranes of the present invention may be produced using any ionically conductive materials. For example, the materials may be produced by copolymerization of styrene and divinylbenzene or butadiene, or the copolymerization of acrylonitrile and butadiene, wherein the cations are firmly attached to the material by, for example, sulfochlorination, and the anions are firmly attached to the material by chloromethylation and reaction with tertiary amines. While the membranes may have any thickness, they are preferably between about 0.1 and about 1 mm thick. Furthermore, the membranes may optionally include a reinforcing material of various kinds and forms depending on the method used to prepare the ionically conductive membranes.

Conventional cation conductive materials include ion-exchange groups such as sulfonic acid groups or carboxylic acid groups. The most preferred cation-exchange membranes include a sulfonic acid group that retains an exchange group even under an acidic condition. Furthermore, because the cation-exchange membranes in accordance with the invention are not required to have any particular capacity, most conventional membranes are suitable. However, for use in fuel cells the cation-exchange membrane will preferably have a capacity between about 0.5 and about 3 milli-equivalents per gram (meq/g), most preferably between about 0.75 and about 2.5 meq/g. Suitable cation-exchange membranes include, but are not limited to, a polymerized type, a homogeneous type or a nonhomogeneous type. Furthermore, the cation-exchange membrane may even include a small amount of an anion-exchange group, but preferably will have cation transport numbers of not less than about 0.9.

Conventional anion exchange materials include ion-exchange groups such as positively charged organic ions, amino or quaternary ammonium groups. The polymeric membrane structure would contain the anion-exchange group locked in the organic network. The polymer can be a copolymer of vinylpyridine, divinylbenzene with monomers such as, styrene, ethylene, methacrylic acid or propylene copolymerized in various amounts. The anion exchange material can have a reinforcing matrix, which may include, without limitation, polyethylene, polypropylene, polyvinylchloride and polyvinyl acetate. The anion-exchange material will preferably have an ion-exchange capacity between about 1 and about 4 milli-equivalents per gram (meq/g). Further, the anion exchange material may be, but is not required to be, a polymerizable type, a homogeneous type or a nonhomogeneous type.

The present invention may be used in association with various known methods for bonding ionically conductive materials or members to adjacent elements, members and the like. The methods specifically include (1) hot pressing, (2) recast films, (3) adhesives, and (4) radiation graft polymerization. Techniques for hot pressing are disclosed in U.S. Pat. No. 5,635,039 and the U.S. Pat. No. 5,961,796 which are both incorporated by reference herein. The elements and/or the ionically conducting members as disclosed herein can be bonded together by applying an adhesive, preferably an ion-conductive adhesive. It should be noted that the solid spacer elements of the present invention are not intended to be removed from the bi-polar membrane. It should be recognized that while the ionically conductive members are preferably bonded and may, in some situations, need to be bonded to operate properly, it is possible in certain applications, especially where high compressive loads are available, that the members may simply be placed in intimated contact.

Yet another method of securing two members together includes applying a thin recast film of a dilute solution of an ion-conducting material onto a first ionically conducting member and a second member, for example securing ionically conducting or inert elements to the first ionically conducting member and allowing the recast film to dry. It may be desirable to apply multiple layers of the recast film with drying between each application. After the last application of recast film, the mated surfaces of the ion selective regions are preferably dried for several hours at room temperature, then baked in the presence of nitrogen at 100° C. for about one hour to cure the recast film so that it does not return to solution when exposed to water.

Radiation initiated graft polymerization can be used to produce ion exchange membranes as well as non-ion exchange polymers. Radiation graft polymerization is commonly performed by exposing a substrate to ionizing radiation in the presence of a monomer in solution. In the early stages of polymerization, graft polymerization occurs in molecules on the surface of the substrate and extends throughout the matrix over time.

Various sources of radiation may be used, such as alpha rays, beta rays, gamma rays electron beams, X-rays, and ultraviolet rays, with gamma rays and electron beams being particularly suitable. The preferred radiation dose is 20–300 kGy.

For use in the present invention, polymerizable monomers may be ones having various functions in themselves, such as hydrated copolymers of tetrafluoroethylene and perfluorocarbon sulfonic acid (or poly-sulfonyl fluoride vinyl ether-containing pendant sulfonic acid groups) which are used to produce NAFION®, or those which can be provided with certain functions by a secondary reaction after grafting. Examples of monomers having ion exchange groups include: acrylic acid, methacylic acid, sodium styrene sulfonate, sodium methallysulfonate, and sodium allylsulfonate. Monomers in which ion exchange groups can be subsequently introduced after graft polymerization include: acrylonitrile, acrolein, vinylpyridine, chloromethylstyrene, and glycidyl methacrylate. A specific example of radiation graft polymerization is given later in this disclosure.

In one embodiment of the invention, the outer surface of the channel forming element is coated by graft polymerization with ion exchange materials. The channel forming element may be formed of various materials including, without limitation, polyethylene, polypropylene, halogenated polyolefins e.g. polyvinyl chloride and polytetrafluoroethylene (PTFE) copolymers of olefin and halogenated polyolefins, typified by ethylene-tetrafluroethylene copolymer and copolymers of olefins and other monomers. Note that these materials do not have any ionic selectivity or electrical current carrying capacity.

The channel forming element is subjected to radiation grafting, typically at 200 kGy of gamma rays in a nitrogen atmosphere, and dipped in an aqueous solution of monomer to form a layer on the surface of the channel forming element having ion-exchange capacity. If necessary, the monomer may then be treated to add the desired ionic groups. The coated channel forming element, rendered ion selective through graft polymerization, may then be positioned or affixed between the anion and cation selective regions as discussed above.

The radiation grafting technique may also be used to deposit layers of ion exchange material over the channel forming elements positioned on top of the anion or cation selective membranes. The channel forming elements may be made from either ion selective or inert materials.

In accordance with the invention, the ion-selective regions or membranes are preferably secured together using an adhesive, such as an "ionic adhesive" made up of positively and negatively charged ion conducting species. Examples of ionic adhesives include, but are not limited to, epichlorohydrin, polyethylenimine, polyacrylic acid, polyvinylamine, poly (4-vinyl) pyridine, powdered commercial anion and cation exchange resin, and combinations thereof. After applying the ionic adhesive, the cation conducting material and the anion conducting material are preferably hot pressed around a plurality of channel forming elements at sufficient temperature and pressure to bond the material into a bipolar membrane. The channel forming elements may be removed or may be left in place as discussed previously. If the channel forming elements are to be removed, this may be accomplished by extraction or dissolution leaving a passage for fluids. A preferred adhesive is an aqueous solution containing a mixture of polyacrylic acid and polyethylenimine, most preferably in a polyethylenimine:polyacrylic acid ratio of about 6:1.

Alternatively, the adhesive may include a polyvinylamine in which the amino group is substituted with an alkyl group having from 1 to 4 carbon atoms. The concentration of the aqueous polyvinylamine solution may be between about 0.5 and about 70 percent by weight, but the preferred concentration is between about 3 and about 15 percent by weight. Solutions of the aqueous polyvinylamine may be obtained, for example, by a conventional method of acidic or alkaline hydrolysis of polyvinylformamide or of polyvinylacetamide with sodium hydroxide solution or hydrochloric acid. A preferred method of forming an aqueous polyvinylamine solution includes hydrolyzing aqueous polyvinylformamide with hydrochloric acid at a temperature between about 60° C. and about 100° C. The aqueous polyvinylformamide concentration is preferably between about 1 and about 50 percent by weight, most preferably between about 5 and about 20 percent by weight. The resulting polyvinylamine solutions are still liquid and can be easily applied onto the membranes.

The adhesive solutions may be applied using any conventional technique, including brushing or roller-coating onto one or both of the ion exchange membranes. Alternatively, the adhesive may be applied to contact points between the coated spacer elements and the membranes. The solution is preferably applied at a temperature between about 100° C. and about 500° C. It is also possible to impregnate the membranes on both sides with the solution. However, the outer membrane surface is preferably washed free of the adhesive during finishing of the bipolar membrane. The thickness of the adhesive layer is preferably between about 0.001 and about 0.05 mm.

The radiation grafting method discussed above may also be used to bind cation and anion conducting membranes. A suitable monomer is applied to one side of each of the membranes and the sides containing the monomer are brought into contact with one another. This "sandwich" is then exposed to radiation, after a defined time, the material will bind via radiation grafting as described above.

Free-radical polymerization can be induced by irradiation of a monomer. A wide variety of monomers can be used in the process, such as, sulfonated divinyl benzene, common divinyl benzene or other non-conducting monomers. However, sulfonation will have to be carried out to activate the linkage of non-conducting monomers. Sulfonation may be accomplished by pumping fuming sulfuric acid or other sulfonating agent through the channels.

The radiation grafting process may be used in two ways to produce bipolar membranes with fluid passages therein. First, two membranes are bound together to create channels between the two membranes. This approach is similar to gluing two membranes together. Monomer is applied to one of the two membranes in a pattern that leaves areas without monomer applied thereto. A second membrane is placed into contact with the monomer, but leaving channels between the two membranes and each area of monomer. A radiation source is utilized, causing radiation grafting of the monomer to each membrane, such that covalent bonds are formed.

Second, materials are attached to the surface of at least one membrane (or ion exchange region) to create a conductive pathway as well as fluid pathways between two ionically conductive regions. This approach focuses on creating channels by attaching material to either side of the bipolar system in such a fashion that flow between the membranes is possible. The binding material (monomer in most cases) may be ionically conductive or non-conductive. Briefly, radiation passes through one of the membranes, contacts the monomer producing free radicals in both the membrane and the monomer. This results in the two membranes being covalently bonded to each other.

The region of bonding or contact between the two ion conductive membranes, defines an interface region therebetween which may include means for delivering fluid directly into the interfacial region. While the interfacial region should conform to the membranes regardless of smoothness or how planar the membranes are, the membranes and the interfacial region are preferably generally planar. There is a means of contacting the anion selective region with the cation selective region or a zone of contact in the interfacial region between the anion and cation selective regions.

Figure 1:
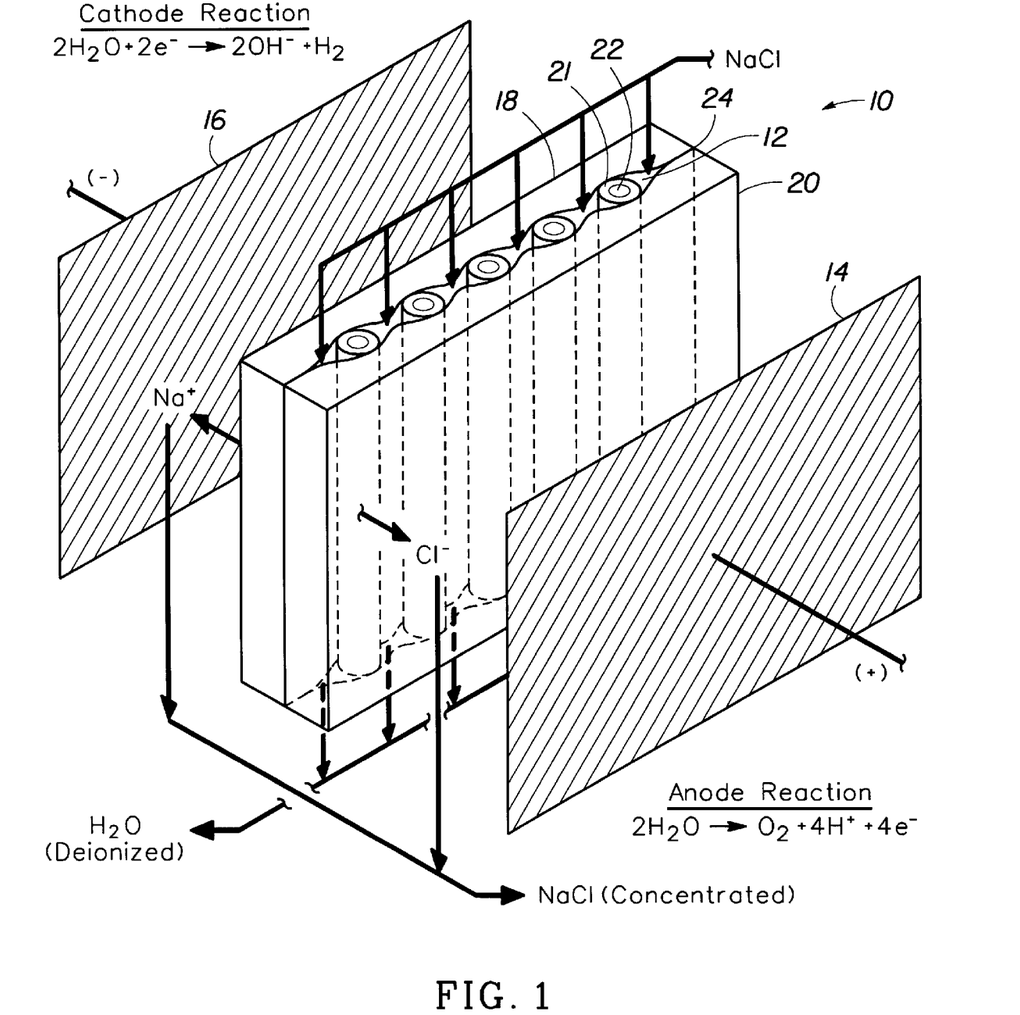
FIG. 1 is a schematic perspective view of a bipolar membrane having fluid distribution passages in accordance with the present invention, where the membrane is being used in a water desalination cell.
Figure 2A:
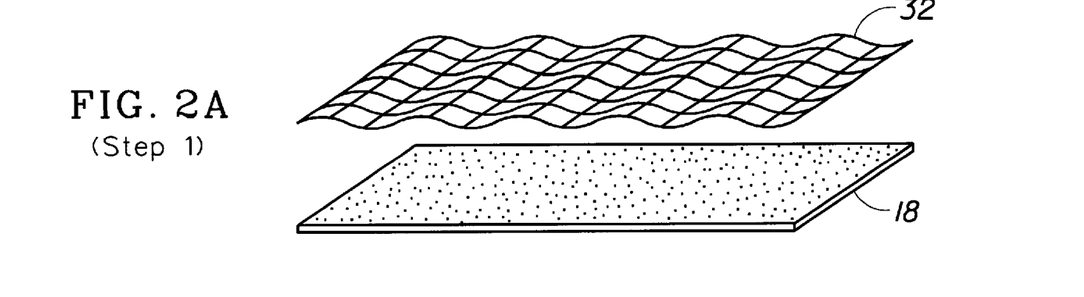
FIGS. 2A–2D show the steps for forming a bipolar membrane having fluid distribution passages formed from a coated channel forming element, where the coating is formed from an ion-selective material.
Figure 2B:
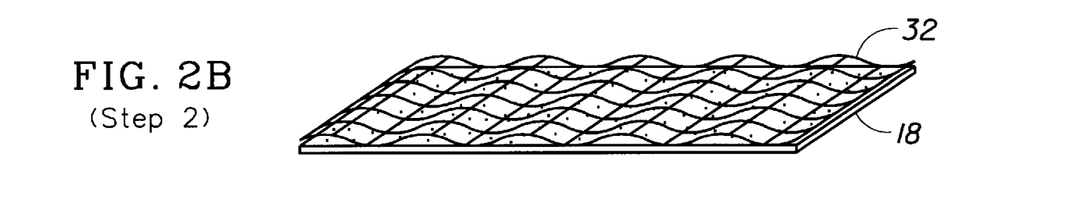
Figure 2C:
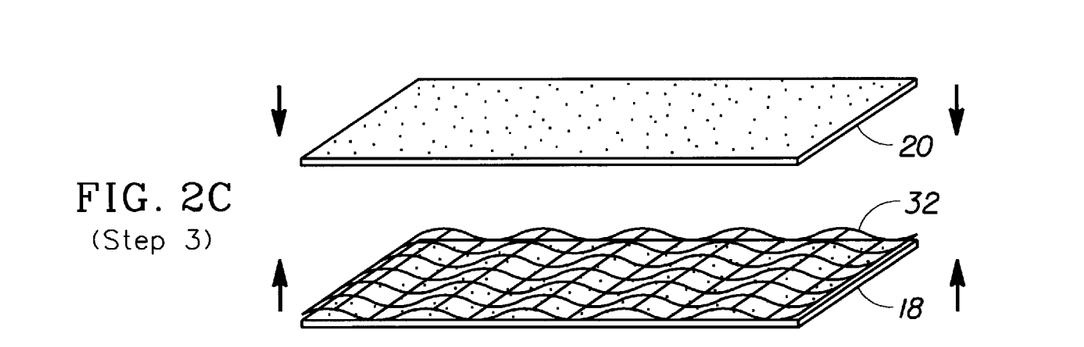
Figure 2D:
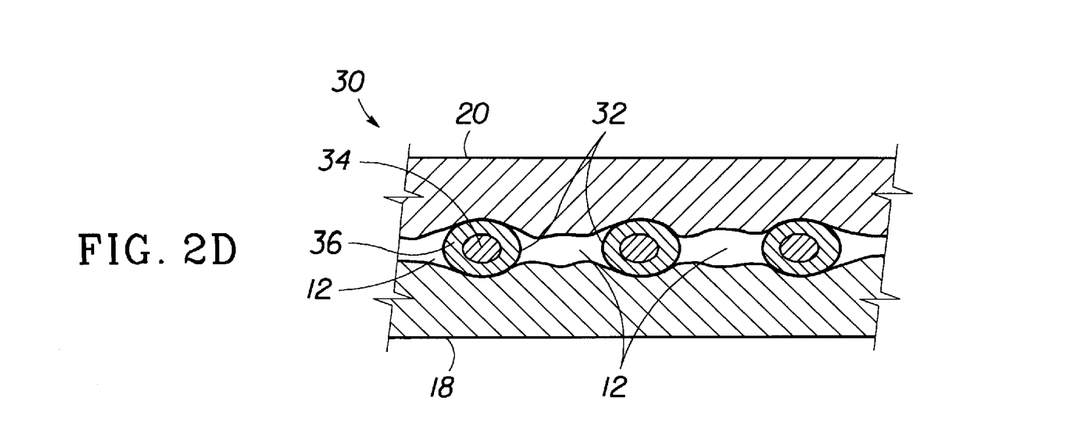
Figure 3A:
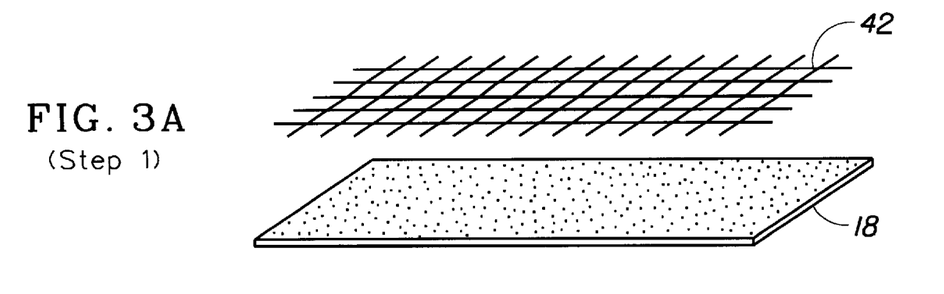
FIGS. 3A–3D show the steps for forming a bipolar membrane having fluid distribution passages that were formed using an ion-conductive channel forming element.
Figure 3B:
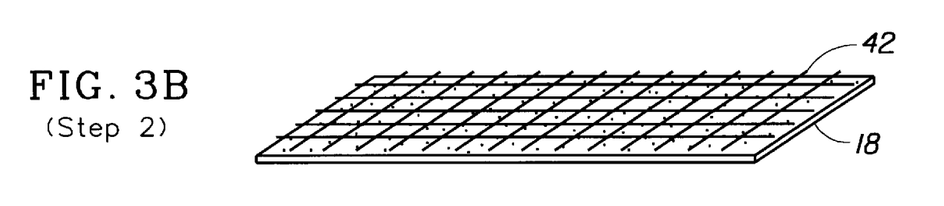
Figure 3C:
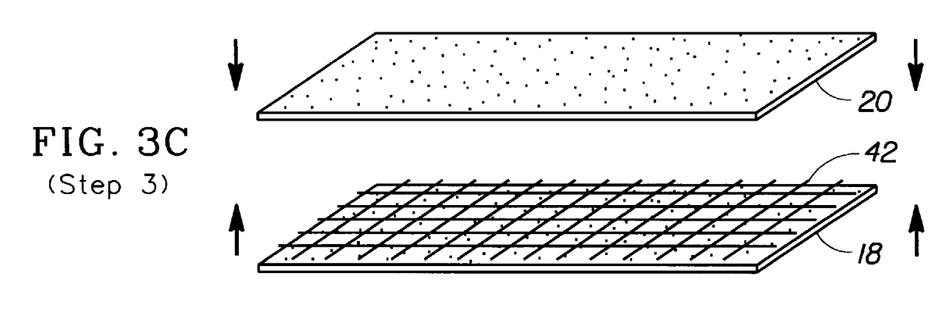
Figure 3D:
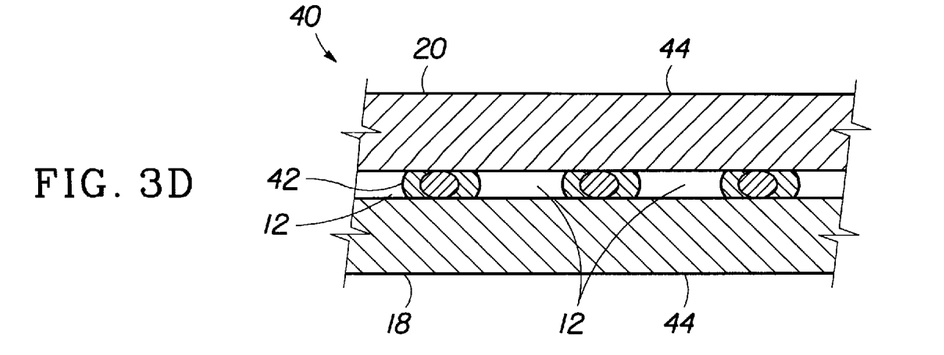

FIG. 1 is a schematic perspective view of a bipolar membrane 10 of the present invention with internal passages 12 being used in a water desalination cell. The bipolar membrane separating the anode 14 and cathode 16 serves the dual purposes of conducting cations to the cathode through the cation exchange member or region 18 and anions to the anode through the anion exchange member or region 20. In this particular embodiment, the bipolar membrane 10 preferably provides passages 12 having a cross-sectional dimension between about 2 and about 9 mils (between about 0.002 inches and about 0.009 inches) within the bipolar membrane and a length extending from one edge of the membrane to another edge. In this manner, water can be provided to the open ends of the passages along one edge of the membrane and delivered throughout the membrane, such as by capillary action or by pressurized flow. The water may even be circulated through the passages and exit the membrane at the open ends.

As shown in FIG. 1, a channel forming element 22 is surrounded by cation exchange material 21, although it may just as well be surrounded by the anion exchange material. As described above, the cation exchange material may be placed around the element 22 by any method, including coating or pressing between two cation exchange members. The anion exchange member 20 is bonded to or pressed against the face of the cation exchange member 18 having the elements 22 formed thereon. Accordingly, an interface is formed between the members 18,20 at each element 22 with fluid passages 12 formed between the elements 22. It is preferable to seal the side edges 24 to form additional passages on the outermost side of the outermost elements 22. The elements themselves may be made from various materials, including inert materials and ionically conducting materials.

FIG. 2 illustrates the steps of a preferred method of forming a bipolar membrane 30 (See FIG. 3) with internal channels 12. The method includes using an ionically conductive channel forming element or spacer 32 between the anion selective region 20 and the cation selective region 18. While the element or spacer 32 is shown here as a unitary piece, it may be equally effective to use a plurality of individual elements instead. The ionically conductive element 32 may either be made from entirely ionically conductive materials or may be a shaped inert material 34 that is covered by an ion exchange material coating 36. The element 32 is shaped such that when the anion and cation selective regions are mated, spaces are formed along the interface between the regions through which fluid may pass. The channel forming elements may include but are not limited to, tube shaped members, rod shaped members, expanded mesh, particulate materials such as small beads or granules, a woven material, or porous sponge-type material. Cloth, ceramic, or organic polymer materials, may also be used as the channel forming elements.

Additionally, the channel forming elements could include gases, to form bubbles or pillows at or near to the interface between the cation and anion selective regions. These channels could be formed by depositing a condensed gas (liquid or solid form, eg. $N_2$ or $CO_2$ respectively) on one of the membranes before attaching or gluing the other membrane. Successive heating or allowing material to reach room temperature would cause the condensed gas to return to the gaseous phase. For example, a line or rod or $N_2$ or $CO_2$ could be placed on top of an anion exchange membrane. The cation exchange membrane would be placed on top and bonded to the anion exchange membrane so as to sandwich the condensed gas between the bonded membranes. When the material returns to room temperature, the channels open as the solid or liquid returns to the gaseous state.

FIG. 3 shows an alternate embodiment of a membrane 40 where the entire channel forming element 42 is formed from a cation or anion selective material, so that no additional ionically conductive coating material need be applied to the channel forming elements. Using these elements has the advantage of providing ionically conductive pathways between faces 44 of the membrane, wherein the pathways constitute a greater proportion of the area of the membrane. The channel forming element is preferably first placed in contact with and bonded to the inside surface of the ion selective region of the same type to form a continuous ion selective region, such as a cation selective element being bonded to the cation selective member. The channel forming element or elements may be formed from any useful shape, include tube, rod or rectangular shaped cation exchange material, an expanded or perforated material, particulate materials such as small ion exchange beads or resin particles, or a woven material. The channel forming element modifies the inner surface of the cation selective region such that, upon mating with the anion selective region at least one open passage is formed between the members of the element. The cation selective region, together with the affixed channel forming element is then brought into contact with, and mated to, the inside surface of the anion selective region. It should be noted that an anion selective material could be used as the channel forming element. Preferably, the element would first be bonded to the anion selective region and then joined with the cation selective region to form the bi-polar membrane.

Figure 4A:
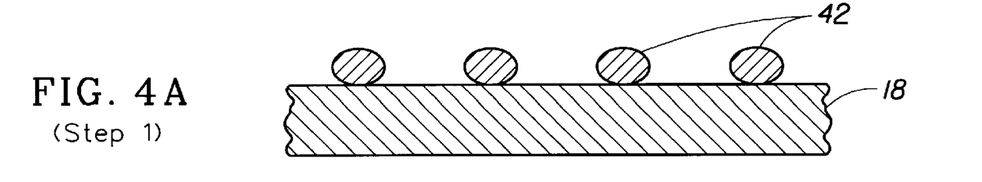
FIGS. 4A–4D show the steps for forming a bipolar membrane formed using an embedded channel forming element.
Figure 4B:
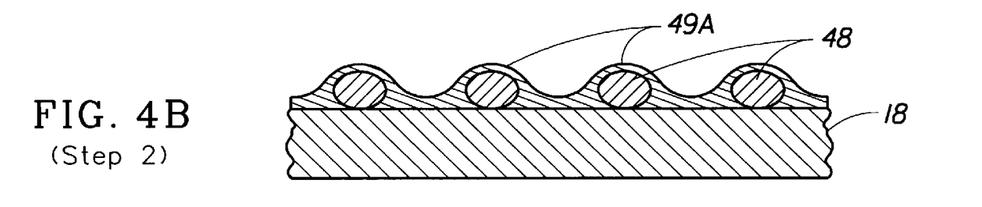
Figure 4C:
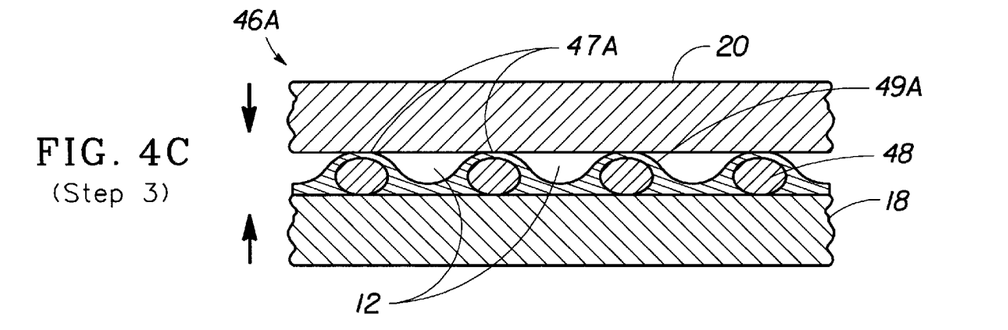

FIGS. 4A–4D show a bipolar membrane 46a formed using an embedded channel forming element 48. The channel forming element 48 may be ion-selective or non-ion-selective (inert) and is placed on the inside surface of one of the ion-selective regions, here a cation-selective region 18. The channel forming element 48 is then over-coated with a layer 49b of ion exchange material, preferably of the same type as the underlying member for the purpose of achieving a good bond, so that the channel forming element 48 and ion selective region 18 are continuous. This may be accomplished, for example, by casting or placing a cation (alternatively anion) selective film 49a over the element as shown in FIG. 4B and onto the cation selective region 18. Also, an ion-conducting adhesive layer or paste, of sufficient thickness to form a continuous layer over the surface of the element can be applied over the element. The spacer 48 is effectively embedded into the inside surface of the cation selective region. The effect is to form a permanently deformed inner surface of the ion selective region. The deformed inner surface is mated with the anion selective region 20 to form an interfacial zone having openings for fluid flow. The cation selective region, together with the embedded elements, when brought into contact with and mated with the inside surface of the anion selective region, forms a single bipolar membrane 46.

Figure 4D:
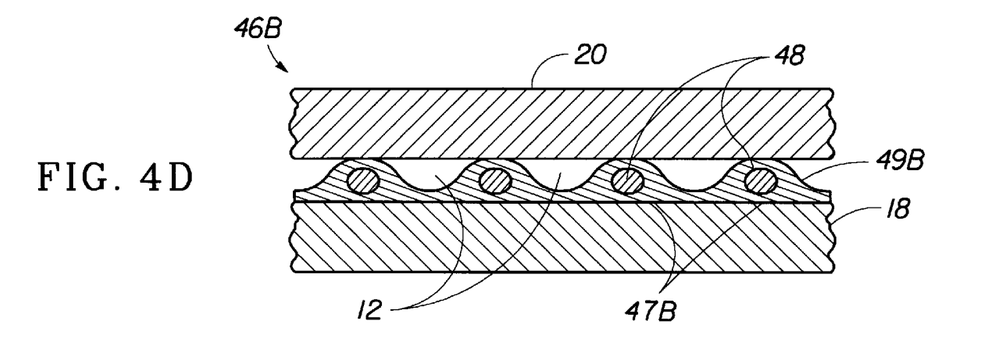

An alternative bipolar membrane design 46b that is specifically within the scope of the present invention is shown in FIG. 4D. The only difference between membrane 46b and membrane 46a is that the type of ionically conductive material forming the layer or film 49b conducts different ions than the underlying member 18 on which it is formed. Following this design provides greater interfacial area 47b between the anion and cation conductive regions than the area 47a provided by membrane 46a. In some applications, this configuration may be preferable.

Figure 5A:
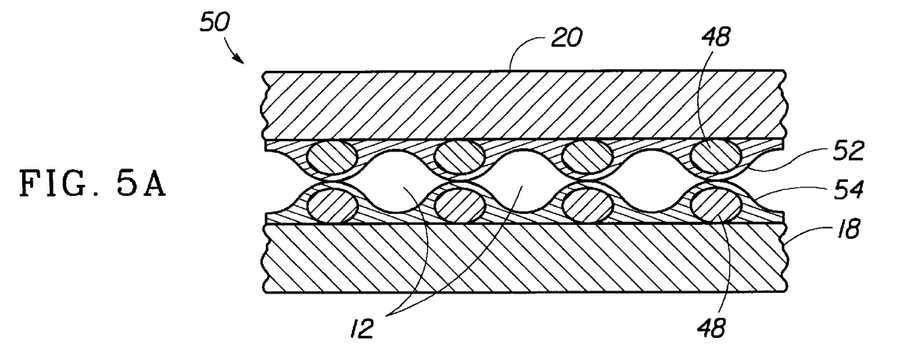
FIGS. 5A and 5B are bipolar membranes formed using different alignments for the two embedded channel forming elements.
Figure 5B:
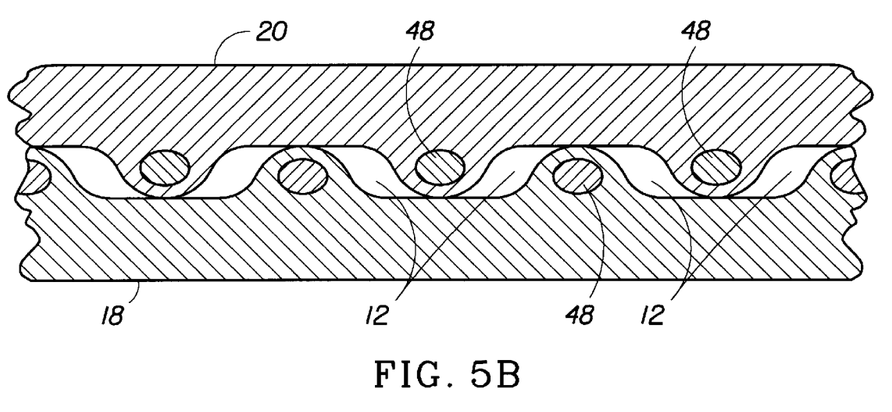

FIGS. 5A and 5B show a bi-polar membrane 50 where the inner surface 52 of the anion selective region 20 and the inner surface 54 of the cation selective region 18 both contain channel forming elements 48, which may be the same or different materials. The elements 48 are preferably covered by a film of ion selective material of the same type as the ion selective member to which it is most closely associated. When the anion and cation selective regions are bonded together, the channels or passages 12 in the interfacial zone are defined by the space between two embedded channel forming elements as shown. Again, the channel forming element 48 may be ion-selective or non-ion-selective (inert).

As shown in FIG. 5A, it is preferred to align the elements on the opposing sides to form the channels in between. It should be noted that while the elements formed to one region may be run at angles (such as at a right angle) to the elements formed on the other region, this may produce a membrane with very little interfacial area. Although the elements in FIG. 5A and also in the other Figures are shown evenly spaced, the elements may be of any spacing, such as closer or farther apart. Specifically, it is within the scope of the invention to provide an increased spacing and offset the elements as shown in FIG. 5B Alternatively, the channel forming element, made entirely from a cation selective material, is placed on the inside surface of the cation selective region. The element is then overcoated with a layer of cation exchange material so that the cation selective channel forming element and cation selective region are continuous. This may be accomplished by casting an ion conducting film over the element or an ion-conducting adhesive layer can be applied over the element. The element is effectively embedded into the inside surface of the cation selective region, forming a permanently deformed inner surface of the cation selective region having openings that allow for fluid flow. The cation selective region is then mated with an anion selective region to form an interfacial zone having passages for fluid flow therein. As stated previously, the same process may be employed using an anion exchange material as the channel forming element bound to an anion selective region.

Figure 6A:
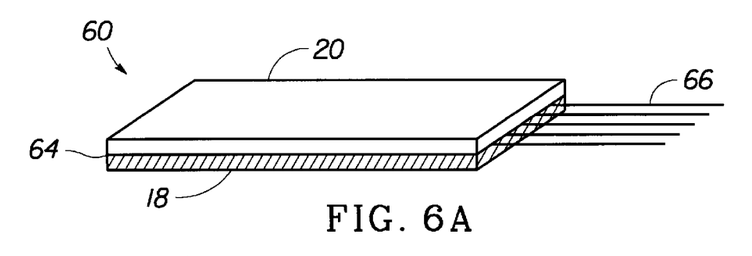
FIGS. 6A and 6B show internal passage formation using photochemical or radiation etching.
Figure 6B:
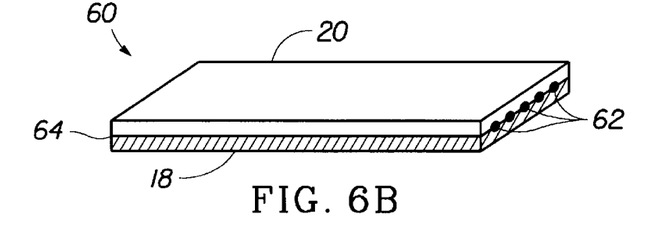

FIGS. 6A and 6B show an internal passage formation using photochemical or radiation etching directed along a plane of the membrane 60 intended to form passages. The ion conductive membranes 18,20 may be bonded first then channels 62 can be cut through the interface 64 between the conductive regions. This may be accomplished again by chemical or mechanical means or preferably by radiation (laser, UV, etc.), illustrated as beams 66. It should be recognized that when the membrane is of a single type, it is not necessary to bond two membranes or members together prior to etching, but rather it is sufficient to have a single membrane having sufficient thickness to accommodate the passages. FIG. 6B illustrates the passages in the resulting membrane shown with the membrane rotated from FIG. 6A.

Figure 7:
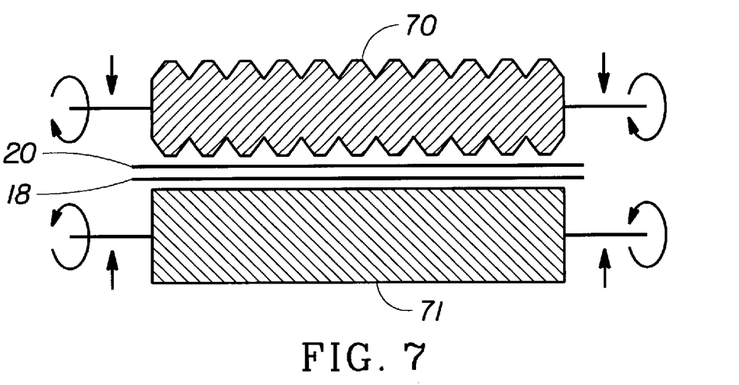
FIG. 7 is a schematic diagram of a roller assembly used for membrane surface modification.

FIG. 7 illustrates a toothed hot roller 70 used to impart a deforming pattern in one or both ion selective regions 18,20. This may be accomplished by the combination of heat and pressure (in the direction of the arrows) in any hot press or hot rolling process. A heated roller 70 can be used to bind the two membranes together in selected regions or to thermoset a shape in one or both membranes individually. A viscous fluid can be used to fill the lumens of the resulting tubules while heat and/or pressure are used to fuse the region in between the fluid channels. The viscous fluid may be removed or evaporated during or after the bonding process. Alternatively, gas may be injected into the unbound regions for opening of those spaces during the bonding or thermoset process. The hot roller may have any pattern allowing fluid flow between the fused portions of the bipolar membrane. The roller 70 is preferably opposed by a heated plate or another heated roller 71 which may or may not also have teeth.

Figure 8A:
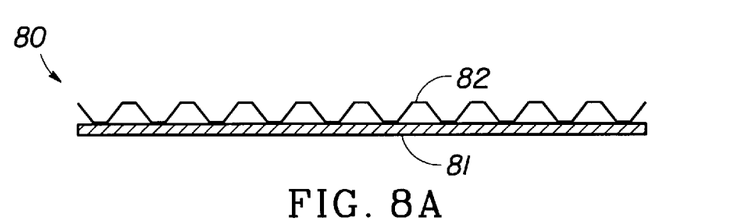
FIGS. 8A and 8B are side views of a membrane formed by physical modification of the membrane surface.
Figure 8B:
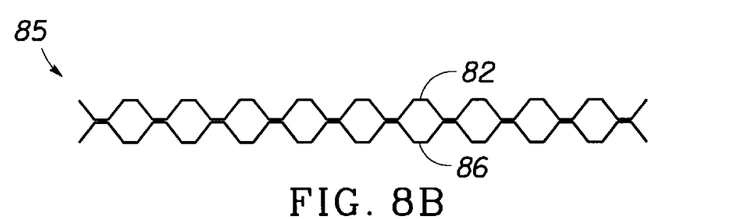

FIG. 8A is a side view of a membrane 80 having one flat member 81 bonded to or in contact with another member 82 having a wavy or irregular configuration that may be accomplished during the creation of the membrane or by physical modification of a membrane surface. A membrane may be physically modified, for example to have a wavy configuration as shown, by passing the individual membrane 82 through a heated roller like that of FIG. 7. FIG. 8B shows a membrane 85 that is similar to the membrane 80 of FIG. 8A, except that both ionically conductive members 82,86 are deformed (nonplanar). As with the membranes of FIGS. 5A and 5B, the spacing of the deformations and the possible offsetting of the deformations may be optimized for the particular application.

Figure 9:
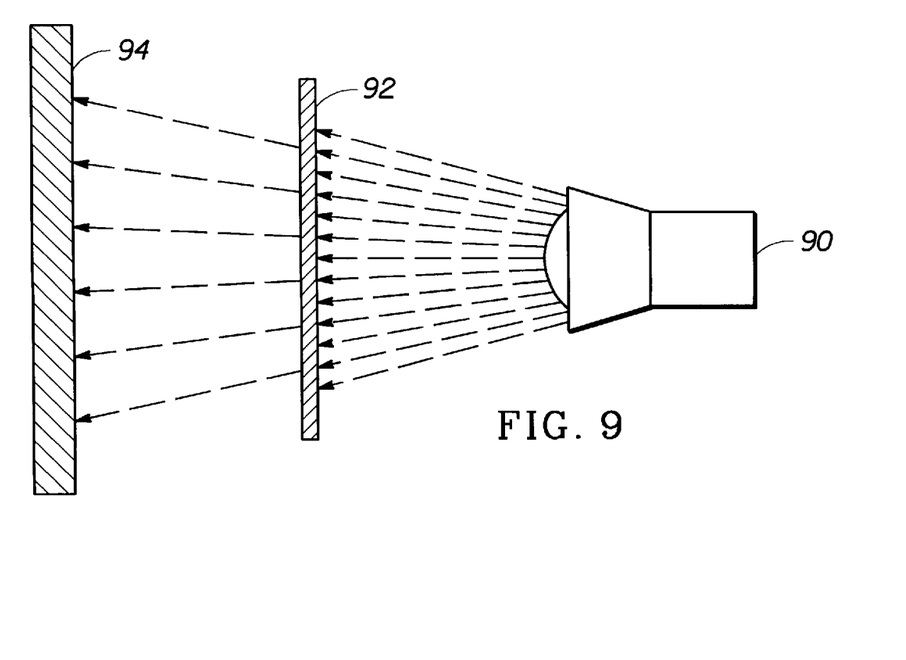
FIG. 9 shows membrane surface modification by photochemical etching or radiation etching.

FIG. 9 is a schematic diagram of a physical, photochemical or other etching/cutting method being used to etch and/or cut channels within the surfaces of one or both of the ion selective membranes prior to their being bonded together. A mechanical cutting device such as a saw or knife may be used to cut the material, but care should be taken to avoid excessive surface heating (temperatures greater than 400 degree C. may decompose the acid form). A light or radiation source 90 is directed through a mask 92 which defines the pattern to be etched or cut into the surface of the membrane 94.

A radiation source without the mask may be utilized for forming channels by binding portions of two membranes using the radiation grafting techniques discussed earlier. The desired design or layout may be painted, printed, or otherwise placed on one membrane using a polymerizable monomer material before placement of another membrane thereon. The polymerizable monomer material is preferably thick enough that it will not spread out over the entire surface of the membrane. The monomer is then polymerized by exposure to radiation to form any desired flow paths through the membrane as defined by the spaces between the polymerized portions of the membrane.

There are several ways to create internal channels between ion selective membranes using radiation and a suitable monomer. The first is simply a covalent bridging bond between the membranes. The bridging bond material may be an ionically conductive or non-conductive material. A similar approach is to bind ion selective material, such as strips, particles, etc., to each of the two membranes, then place the two membranes in contact. This would allow ionic conductivity between the membranes while allowing fluid flow. Both of which have been discussed earlier in this document.

In the bipolar membrane of the present invention, the cation-exchange membrane may be bonded to the anion-exchange membrane by any method. However, it is preferred that the cation exchange membrane and the anion-exchange membrane be adhered closely to each other at a peel strength of not less than 0.2 kg-f25 mm in a wet state to prevent separation of both the membranes when the bipolar membrane is used in a wet state, such as in water splitting. This also applies to applications where the membranes are of like charge, such as proton exchange membrane (PEM) fuel cells, and electrolysis cells for production of hydrogen, ozone, oxygen or chlorine. A bipolar membrane with a low peel strength may allow bubbles or blisters to form at the interface between the anion conducting membrane and the cation-conducting membrane during use. Bubbles and blisters cause a reduction in current efficiency per unit membrane surface area and a gradual increase, over long periods of use, in membrane potential. Such membranes must be periodically replaced.

Figure 10:
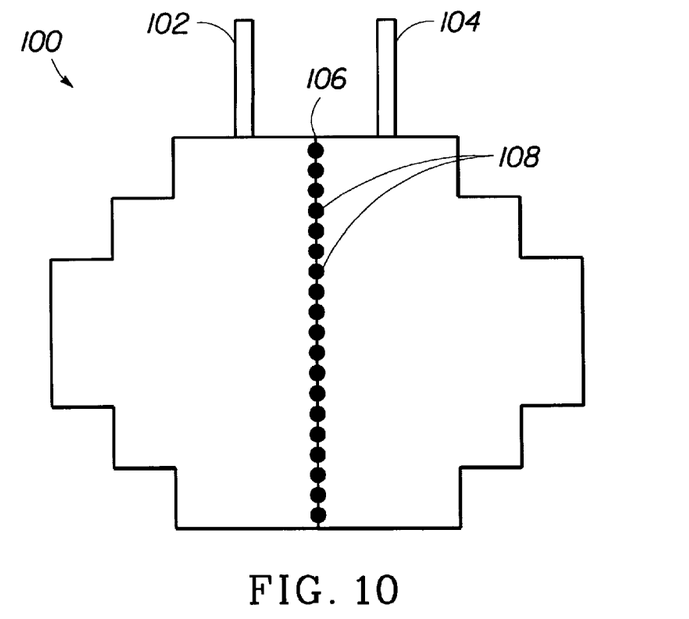
FIG. 10 is an injection mold for forming a bipolar membrane with internal passages defined by removable elements.

FIG. 10 illustrates an apparatus 100 in which a bipolar membrane containing channels is constructed by a molding process such as an injection molding process. The bipolar region is produced by first injecting ionically conductive material through port 102 and a second ionically conductive material through port 104 or otherwise placing conductive material into a mold designed to produce the desired results. The material is allowed to cure, before ejecting the membrane from the mold, such as by separating the mold along an interface 106. Channels are constructed or otherwise made by extending mold slides or pins through the closed mold, where the pins act as removable elements withdrawn to leave integral passages within the membrane.

Figure 11:
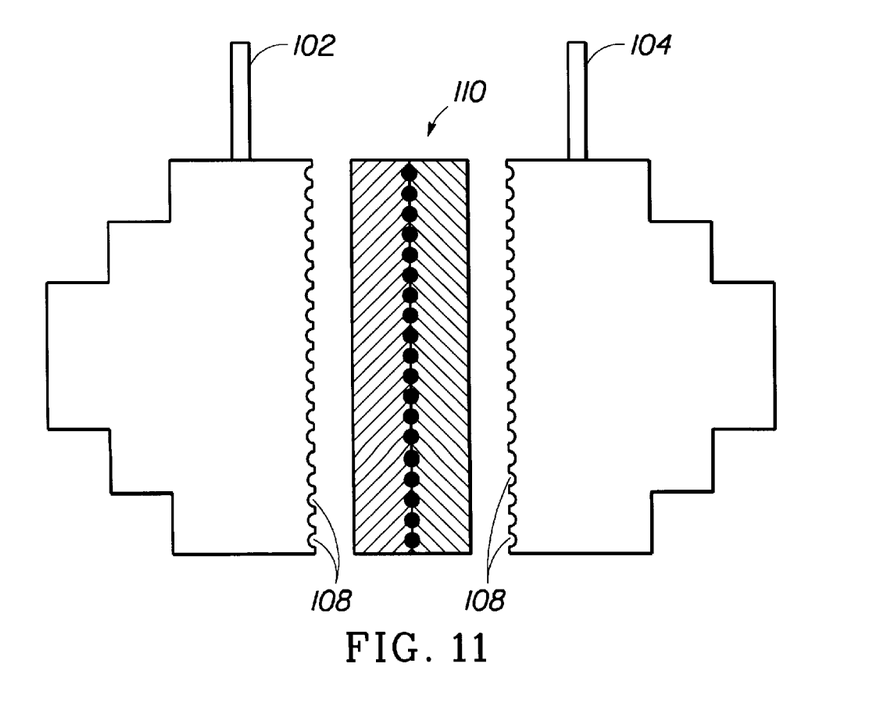
FIG. 11 shows the bipolar membrane formed by using the injection mold of FIG. 10.

FIG. 11 illustrates the molded bipolar membrane 110 formed in the mold 100 of FIG. 10. While similar to the etching and cutting processes, this method may have advantages over the other methods with regard to manufacturability. The two molten plastics or dissolved polymers that will comprise the two ionically conducting materials are introduced at a defined rate to fill the mold evenly. After the material cools sufficiently, pens or slides are removed, leaving channels between the two sides of the bipolar membrane. The mold then opens and ejects the final product. Another route to produce the membrane would be to inject molten or otherwise liquid material into the mold as it lies on one side to fill and solidify the material on one half of the mold, then flip (or rotate along the planar axis) the mold over and fill the other side of the mold.

Another method of making the bipolar membranes of the present invention is by film casting a "polymer solution" into a mold containing ridges and valleys which ultimately will form channels in the assembled bi-polar membrane. General methods for casting membranes are well known in the art. Cast or mold materials may be made of any material that will allow either concave or convex structural modifications. Generally these molds are made from metal of some sort such as steel or aluminum, although glass has some advantages in that it is metal free, more easily cleaned, etc.

The term "polymer solution" as used herein refers to the mixing of pre-formed, soluble polymers. In particular a 5% PFSA (Nafion® 1100 equivalent weight, obtained commercially as a 5% weight/weight (w/w) solution in light alcohols and ethers) diluted to between 0.5–5% (w/w) in a solvent (Examples include but are not limited to Isopropyl Alcohol (IPA), dimethyl sulfoxide (DMSO), dimethylformamide (DMF), and methanol (MeOH)). This solution is poured, sprayed or otherwise added to a cast containing the desired channel layout. The solution is then spread onto a substrate, e.g., a glass plate or previously formed layer(s) of a membrane, to a generally uniform thickness. Upon evaporation of the solvent from the polymer solution, the membrane film is cured, generally, by heating to >90 degrees C. for 30 minutes or more.

After the film is cured, the film is removed from the casting mold. The film may be removed by wetting it with water or an aqueous Potassium Sulfate ($K_2SO_4$) solution. When glass plates are employed as the mold or cast, the membranes may be removed in a salt solution, such as 0.5 molar $Na_2SO_4$. The resulting film is insoluble in aqueous solvents. The thickness of the film can be varied to meet the particular application requirements.

Another method for forming membranes is by copolymerizing two different monomers directly on the cast or mold itself. Alternatively, if the polymerization reaction is slow enough, the monomers may be mixed in another vessel and poured onto the cast or mold. For example, a fluorocarbon monomer reacts with styrene via gamma irradiation initiated free-radical polymerization and is subsequently sulfonated to give sulfonic acid pendant chains.

Grafting polystyrene onto polymeric materials (e.g. PTFE) may also be used to produce a copolymer via gamma irradiation. Copolymer grafts may be formed by attaching an unsaturated carboxylic acid, such as acrylic or methacrylic acid, to give carboxylic acid pendant chains. The membrane is prepared by grafting the styrene onto the fluorocarbon polymer using gamma irradiation and then sulfonating the grafted polymer, for example by using fuming sulfuric acid ($H_2SO_4SO_3$), chlorosulfonic acid, or grafting an unsaturated carboxylic acid onto the fluorocarbon polymer using gamma irradiation. The gamma irradiation of the fluorocarbon polymer forms free radical sites, which are then available for reaction with an unsaturated monomer, such as styrene. Again, this was discussed earlier. The electrolytic resistance of the ion exchange membrane is related to the percentage of styrene grafted thereon. When subsequently sulfonated, the electrolytic resistance decreases as the percent graft increases. In general, the useful range of the percent graft is from 10 to 50 percent, more preferably 10 to 20 percent. The membrane to be modified is generally made from a polytetrafluoroethylene or an ethylene-propylene copolymer base film of the desired thickness which is grafted with styrene via gamma irradiation, using a cobalt-60 source.

The copolymerization process may also be carried out by chemical means. The process is the same as above, with the exception of using a chemical, for example a free radical initiator such as 2,2-Azobisisobutyronitrile (AIBN), to initiate the radical reaction.

An anion conducting membrane may be formed in a similar fashion. For example, by mixing 10.075 g poly (styrene-35 wt. % vinylbenzyl chloride) copolymer in dimethylformamide (DMF) to form a 15 wt. % solution to which is added 0.83 g of 3:1 molar ratio N,N-dimethyl-1,3-propanediamine (DMPDA) to N,N,N',N'-tetramethylhexanediamine (TMHMDA), an anion conducting membrane is formed. The mixed amine-containing solution is spread onto a molded substrate to a thickness of about 25 mils (or as desired). The cast solution is held at room temperature for about 30 minutes and then dried in an oven at 125° C. for about 8 minutes to form an anion exchange membrane.

EXAMPLE 1

In the following example, Nafion® was used as the conductive coating material and polypropylene mesh was used as the channel forming element. Polypropylene mesh was chosen because it is inert to attack by chemical substances, and its small mesh size allows for more contact with membrane material, thus allowing higher rates of ionic flow.

The following steps describe the production of Nafion coated channel forming elements. Due to the manufacturing process, the surface of the polypropylene mesh was somewhat smooth. Therefore, it was necessary to roughen the surface of the polypropylene prior to coating. Four sheets measuring about 11×11 cm were bead-blasted for roughly 8 minutes per side (total time was ~1 hour) using a bead-blasting apparatus. These sheets were cut into 2.2 cm×2.2 cm squares (25 pieces per sheet) and sonicated in DI water for 20 minutes to remove particulates. The squares were then rinsed with DI water and sonicated (10 minutes) once more with a 50/50 mix of DI water and methanol to remove oily residues. Upon removal, the mesh was rinsed a final time with methanol and place in a drying oven at 50° C. for 2 hours.

A dipping solution was prepared by mixing Nafion® Solution (DuPont, Type SE-5012) with an equal portion of Isopropyl Alcohol (Fisher Scientific). Each set of 25 squares required 40 mL solution (20 mL Nafion solution+20 mL Isopropyl Alcohol).

Each 2.2 cm² mesh was dipped into the dipping solution. Upon removal from the solution, an air gun was used to open the pores in the mesh while drying the dipping solution. The freshly coated squares were then dried in an oven at 130° C. for 45 minutes. The dipping process was repeated three more times with the final drying time extended to 1.5 hours.

Each mesh square was then spray-coated (using an air brush) with a variation of the dipping solution (10 mL Isopropyl Alcohol, 10 mL Water, 20 mL Nafion Type SE-5012), and allowed to air-dry overnight followed by oven drying at 130° C. for 45 minutes.

The loading or degree of coating was determined by simple mass gain. Each square was weighed before the first coating and again after the final drying. The mass gain ranged from 25–40%. The resulting coated mesh was used as a channel forming element between the anion and cation selective layers.

A plate-and-frame system was used to construct two electrochemical cells, with each cell having 10 bipolar membrane cells. The bipolar membrane unit with internal channels—consisted of an anion selective region, a cation selective region, and a channel forming element sandwiched between them. A plurality of membrane units were then placed between two electrodes, the anion exchanger facing the anode and the cation exchanger facing the cathode. The anode was made of titanium coated with platinum. Alternatively, the anode could be a dimensionally stable anode (i.e., DSA) such as iridium dioxide ($IrO_2$) coated onto a titanium substrate. It is preferable to use a bifunctional electrode, such iridium dioxide coated titanium, for both the anode and cathode, since polarity reversal or periodic polarity reversal is quite often used in electrodialysis to clean the membranes.

A contaminated feed stream was introduced into the internal channels of the bipolar membrane units which served as diluting channels. A potential was applied across the electrodes. Because of the semi-permeable properties of the membranes and the directionality of the electrical potential gradient, negatively charged ions migrated towards the anode (positive electrode) and positively charged ions migrate towards the cathode (negative electrode). This caused depletion of the ions inside the diluting channels and concentration of these ions in the adjacent compartments.

Figure 12:
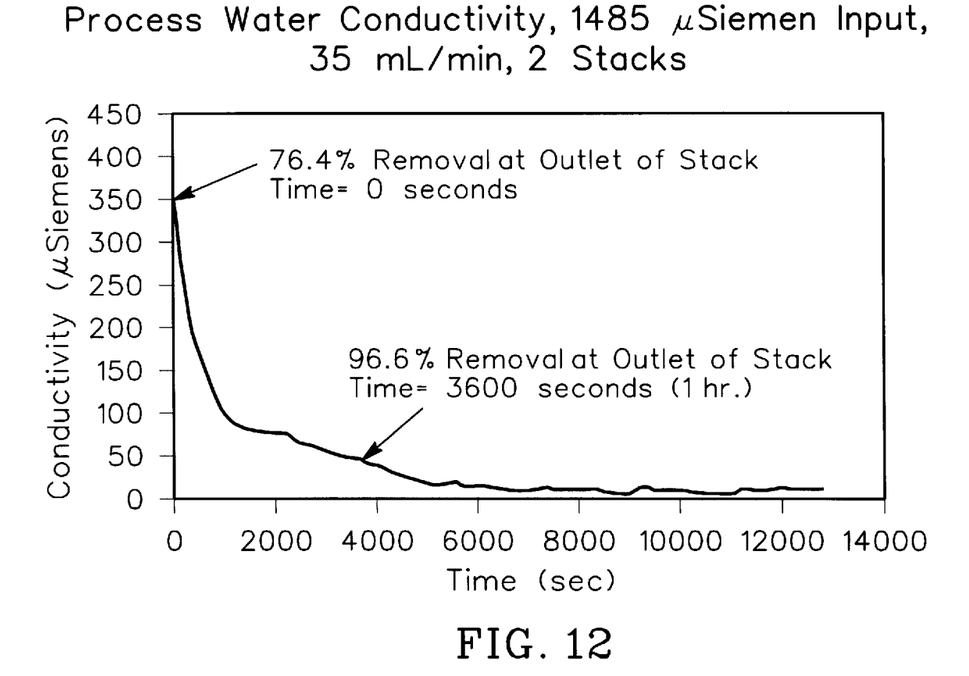
FIG. 12 is a graph of the performance of the desalination cell of FIG. 1.

The electrodeionizer cell treated solutions containing calcium and magnesium salts with no apparent loss of performance, therby indicating the potential to use this device for water deionization and water softening. FIG. 12 shows the results for removing ionic contaminants from water using the bipolar membrane constructed in accordance with this Example. It should be noted that inorganic as well as charged organic species can be effectively removed from feed water using this technology. FIG. 12 also illustrates the improved functionality of the system as it achieves operational conditions. Purification improved and leveled off after a couple of hours. In this case, the process water was delivered as a single pass system flowing at 35 mL/min. The flow rate of the resulting concentrate stream was 2 mL/min.

The bipolar membranes of the present invention are useful in many electrodialysis methods and apparatus, wherein fluid is introduced directly into the interfacial region or zone of the membrane as shown in the U.S. Pat. No. 5,961,796 which is incorporated by reference herein.

While the foregoing is directed to the preferred embodiment of the present invention, other and further embodiments of the invention may be devised without departing from the basic scope thereof, and the scope thereof is determined by the claims which follow.

What is claimed is:

1. A method of making an ionically conductive membrane sheet, comprising:
   securing two ionically conductive members together from opposing sides of at least one element to form a substantially unobstructed passage adjacent to the at least one element and between the members, wherein the passage provides fluid communication from an edge of the members and along the at least one element.

2. The method of claim 1, wherein the ionically conductive material is selected from cation-conductive material, anion-conductive material or a combination thereof.

3. The method of claim 1, wherein the element is selected from a porous tube, a manifold, a channel bar, a filament, a mesh or combinations thereof.

4. The method of claim 1, wherein the ionically conductive material is provided as sheets.

5. A method of making an ionically conductive membrane, comprising:
   providing first and second ionically conductive members;
   disposing at least one element between the first and second ionically conductive members; and
   bonding the first and second ionically conductive members to opposing sides of the element to provide a substantially unobstructed passage between the first and second ionically conductive members.

6. The method of claim 5, wherein the first and second ionically conducting members are cation-conductive members.

7. The method of claim 5, wherein the first and second ionically conducting members are anion-conductive members.

8. The method of claim 5, wherein the first ionically conductive member is a cation-conductive member and the second ionically conducting member is an anion-conductive member.

9. The method of claim 5, wherein the element is selected from a porous tube, a manifold, a channel bar, an ionically conductive filament, an inert filament coated with ionically conductive material, or combinations thereof.

10. The method of claim 5, wherein the step of bonding includes one or more processes selected from hot pressing, applying an adhesive, or combinations thereof.

11. The method of claim 5, wherein the passage extends along the interface between the first and second ionically conducting members.

12. The method of claim 5, wherein the at least one element is a plurality of elements, and wherein a passage is formed adjacent each of the plurality of elements.

13. The method of claim 5, wherein the first and second ionically conducting members are sheets, and wherein the passage extends in a plane that is substantially parallel to the sheet surfaces.

14. The method of claim 5, wherein the element comprises an ion conducting material.

15. The method of claim 5, wherein the element is coated with an ion conducting material.

16. The method of claim 5, wherein the element comprises a fluid permeable material.

17. The method of claim 5, wherein the element comprises a filament selected from an ionically conductive filament, an inert filament coated with ionically conductive material, or combinations thereof, and wherein the filament forms an expanded mesh.

18. The method of claim 5, wherein the at least one element is selected from cloth, ceramic and polymers.

19. The bipolar membrane obtained by the method of claim 5.

20. A method for making an ionically conductive membrane, comprising:

disposing two or more elements over a surface of a first ionically conductive member;

forming a layer of ionically conductive material over the two or more elements and into contact with the surface of the first ionically conductive member to form an ionically conductive surface having protrusions; and bonding a second ionically conductive member to the protrusions leaving passages between protrusions.

21. The method of claim 20, wherein the two or more elements are elongated and the protrusions are ridges.

22. A method for making an ionically conductive membrane, comprising: directing a laser to cut into an ionically conductive sheet to form a plurality of substantially unobstructed linear passages through the sheet, wherein the passages are substantially parallel to a surface of the sheet.

23. A method of making an ionically conductive membrane, comprising:

providing a first ionically conductive member having a deformed surface defining a plurality of protrusions having peaks; and bonding a second ionically conductive member to the peaks of the protrusions to form passages between the peaks.

24. The method of claim 23, wherein the second ionically conductive member has a deformed surface defining a plurality of protrusions having peaks, and wherein the peaks of the first and second ionically conductive member are bonded.

25. The method claim 23, wherein the bonding is selected from hot pressing, applying adhesive, radiation graft polymization, applying recast films or combinations thereof.

* * * * *

UNITED STATES PATENT AND TRADEMARK OFFICE
CERTIFICATE OF CORRECTION

PATENT NO. : 6,103,078
DATED : August 15, 2000
INVENTOR(S) : G. Duncan Hitchens

It is certified that error appears in the above-identified patent and that said Letters Patent are hereby corrected as shown below:

column 1, line 3, after the Title insert --This invention was made with Government support under contract NAS9-97014 awarded by NASA. The Government has certain rights in this invention.-- change the first inventor's name from G. Duncan Hitchems to --G. Duncan Hitchens--

Signed and Sealed this

Tenth Day of April, 2001

Attest:

NICHOLAS P. GODICI

Attesting Officer

Acting Director of the United States Patent and Trademark Office